United States Patent
Bossecker et al.

(10) Patent No.: US 6,572,137 B2
(45) Date of Patent: Jun. 3, 2003

(54) AIRBAG ARRANGEMENT, METHOD THEREOF, AND A VEHICLE WITH THE AIRBAG ARRANGEMENT THEREOF

(75) Inventors: Maximilian Bossecker, Blaustein (DE); Ulrich Karlbauer, Ulm (DE)

(73) Assignee: Takata-Petri (ULM) GmbH, Ulm (DE)

(*) Notice: Subject to any disclaimer, the term of this patent is extended or adjusted under 35 U.S.C. 154(b) by 29 days.

(21) Appl. No.: 09/878,919

(22) Filed: Jun. 13, 2001

(65) Prior Publication Data
US 2002/0014760 A1 Feb. 7, 2002

(30) Foreign Application Priority Data
Jun. 13, 2000 (DE) .......................... 100 29 046

(51) Int. Cl.[7] .............................................. B60R 21/22
(52) U.S. Cl. ................................ 280/730.1; 297/216.12
(58) Field of Search ............................... 280/730.1, 729, 280/728.1, 730.2; 297/216.12, 216.13, 216.14, 391

(56) References Cited

U.S. PATENT DOCUMENTS

| | | | |
|---|---|---|---|
| 3,655,217 A | * 4/1972 | Johnson | 280/737 |
| 3,779,577 A | * 12/1973 | Wilfert | 280/730.1 |
| 5,454,591 A | * 10/1995 | Mazur et al. | 280/735 |
| 5,738,407 A | 4/1998 | Locke | |
| 5,782,529 A | * 7/1998 | Miller et al. | 297/216.13 |
| 5,833,312 A | * 11/1998 | Lenz | 297/216.13 |
| 6,199,900 B1 | * 3/2001 | Zeigler | 280/735 |
| 6,299,199 B1 | * 10/2001 | Bowers et al. | 280/730.2 |
| 6,386,581 B1 | * 5/2002 | Ohno | 280/735 |

FOREIGN PATENT DOCUMENTS

| | | |
|---|---|---|
| DE | 43 20 147 A1 | 1/1994 |
| DE | 195 09 014 A1 | 9/1996 |
| DE | 198 42 829 A1 | 3/2000 |
| JP | 10-006907 | 1/1998 |
| JP | 10-71915 | 3/1998 |
| JP | 05-049523 | 3/1998 |
| JP | 11-334516 | 12/1999 |
| JP | 11-342822 | 12/1999 |

* cited by examiner

Primary Examiner—Paul N. Dickson
Assistant Examiner—David R. Dunn
(74) Attorney, Agent, or Firm—Foley & Lardner

(57) ABSTRACT

A vehicle has an airbag arrangement for protecting the occupant from neck whiplash during a front or rear collision and the cervical spine during a vehicle roll over. The airbag arrangement has an airbag device integrated with the vehicle seat. The airbag device has at least one airbag for protecting the occupant's head/neck region. The airbag is fully inflated when the vehicle rolls over. In that state, the airbag projects from the vehicle seat in such a way that it actively bends the occupant's head toward the occupant's chest, i.e., rolls the upper body for better protection. During a front and rear collision without a roller over, however, the airbag only partially inflates to an extent to position the airbag between the occupant's head and the head restraint, without displacing the occupant's head with the airbag.

28 Claims, 5 Drawing Sheets

AIRBAG ARRANGEMENT, METHOD THEREOF, AND A VEHICLE WITH THE AIRBAG ARRANGEMENT THEREOF

BACKGROUND

An airbag arrangement for protecting a vehicle occupant's head/neck region is known. In the known arrangement, an airbag device is integrated with the vehicle seat. The airbag device has at least one airbag serving to protect the occupant's heat/neck region. When the vehicle collides at its front or rear, the airbag inflates and deploys in the region of the head restraint of the vehicle seat. In the front collision, for example, the mass inertia initially moves the occupant in the direction of travel against a restraining system, such as a safety belt. The reaction force of the restraining system thereafter draws the occupant back into the vehicle seat. The airbag cushions the impact of the occupant's back head/neck region to prevent or minimize a cervical spine whiplash trauma.

There is still a need to improve the protection capability, particularly during a vehicle rollover. The present invention addresses this need.

SUMMARY OF THE INVENTION

The present invention relates to a protection device for a passenger, namely an airbag arrangement for a vehicle and a method thereof. The present invention also includes a vehicle incorporating the airbag arrangement.

The airbag arrangement comprises an airbag device integrated with a vehicle seat, which can include a seat portion and a backrest extending from the seat portion, and a head restraint extending from the backrest. The airbag device can be integrated to at least one of the backrest and the headrest. The airbag device has at least one airbag for protecting the head/neck region of an occupant. According to the present invention, the airbag, in its substantially fully inflated state, extends forwardly and upwardly from the vehicle seat at an incline relative to the backrest for actively inducing a bent posture, that is, rolling or bending the occupant's head toward the occupant's chest.

The airbag device further includes a gas generator and a control unit for actuating the gas generator, which can be a multistage type. The control unit can be programmed to actuate the gas generator when the vehicle rolls over to fully inflate the airbag or when the vehicle is in a front or rear collision to partially inflate the airbag to an extent to position the airbag between the occupant's head and the head restraint, without displacing the occupant's head with the airbag.

The control unit can also be programmed to prevent the airbag from being deployed when the vehicle seat is in a predetermined position, identified as unsuitable for deploying the airbag, when the occupant is not strapped to a vehicle seatbelt, or when the vehicle seat is unoccupied. The control unit can also be programmed to output a signal for delaying deployment of a front airbag arranged in the vehicle in front of the vehicle seat when the airbag for protecting the head/neck region is to be deployed.

At least the head restraint supports the airbag in the substantially fully inflated state. The airbag in the substantially fully inflated state is also adapted to be also supported on a roof of the vehicle.

The airbag in the substantially fully inflated state can form a wedge-shaped profile, adapted to be positioned between the occupant's head and the backrest for pressing the occupant's head into the bent posture.

The airbag can include raised lateral margins extending along sides of the airbag. In the substantially fully inflated state, the raised lateral margins can extend along the direction of the seat portion.

The airbag can include a supporting portion and a holding portion. When the airbag is in the substantially fully inflated state, the holding portion is adapted for actively bending the occupant's head, and the supporting portion is arranged between the vehicle seat and the holding portion. The holding portion can comprise a plurality of longitudinal chambers arranged side by side and communicating with each other, and the airbag in the inflated state, is adapted to extend along a longitudinal directions of a vehicle roof. The supporting portion also can include at least one elongate chamber that extends transversely to the longitudinal direction of the backrest.

The airbag can also be sub-divided into the holding portion and the supporting portion, the holding portion and the supporting portion forming a common chamber.

The airbag also can comprise a plurality of elongate chambers arranged serially next to one another and communicate with each other. In the substantially fully inflated state of the airbag, the elongated chambers can extend transversely to the longitudinal direction of the backrest. The individual chambers can be connected to one another serially so that the airbag, in the substantially fully inflated state, has a curved profile extending from the backrest for bending the occupant's head.

The airbag or the holding portion in the substantially inflated state can also be configured to act as a chute, for pressing the occupant's head into the bent posture and for guiding the bent head in a predefined manner during movement of the occupant in a fore and aft direction of the vehicle.

The airbag device can include a first airbag integrated with the backrest for bending the occupant's head to assume the bent posture, and a second airbag integrated with the head restraint for supporting the first airbag. The second airbag can be arranged between the head restraint and the first airbag when the first and second airbags are in the substantially fully inflated state.

The airbag can also be substantially airtight so that the internal pressure in the airbag after inflation can be maintained for a period of about 5 to 7 seconds.

The head restraint can be adjustable between a lower position and an upper position. The airbag can be configured to raise the head restraint to the upper position during deployment to support the airbag over a larger area of the head restraint.

The seat covering of the backrest can have a tear line(s) for tearing apart in a predefined manner so that the seat covering torn from the backrest can be arranged between the occupant and the airbag in the substantially inflated state.

The vehicle according to the present invention can incorporate all or some of the above features of the airbag arrangement.

The method of protecting an occupant of a vehicle according the present invention can include: providing an airbag device integrated with a vehicle seat, the airbag device having at least one airbag for protecting the head/neck region of an occupant; and fully inflating the airbag when the vehicle rolls over to bend the head of the occupant toward the chest of the occupant into a bent posture with the airbag as the airbag is fully inflating. The method can further include partially inflating the airbag when the vehicle is in a front or rear collision to an extent to position the airbag between the occupant's head and a head restraint of the vehicle seat, without displacing the occupant's head with the airbag. It can further include preventing the airbag from being deployed when the vehicle seat is in a predetermined position, identified as unsuitable for deploying the airbag, when the occupant is not strapped to a vehicle seatbelt, or when the vehicle seat is unoccupied. Moreover, it can include delaying deployment of a front airbag arranged in the vehicle in front of the vehicle seat when the airbag for protecting the head/neck region is to be deployed. The other features described in the airbag arrangement can be included in the present method.

BRIEF DESCRIPTION OF THE DRAWINGS

These and other features, aspects, and advantages of the present invention will become more apparent from the following description, appended claims, and accompanying six exemplary embodiments shown in the drawings, which are briefly described below.

DETAILED DESCRIPTION

Six exemplary embodiments, as shown in FIGS. 1–8 serve to illustrate the present invention. In this regard, same or corresponding elements are labeled with the same reference numerals. Although references are made here to directions in describing the structure, they are made relative to the drawings (as normally viewed) for convenience. The directions, such as upper and lower, are not intended to be taken literally or limit the present invention in any form.

FIGS. 1–8 schematically illustrate the side views of a vehicle seat 10 of a motor vehicle V, on which an occupant 12 sits. The seat 10 typically has a seat portion 14 and a backrest 16 extending from the seat portion 14. The backrest 14 can be tilted at different angles relative to the seat portion 14. A backrest 16 further includes a head restraint 18 adjustably fastened to its top side, and adjustable between a lower position and an upper position. Each of the exemplary six embodiments has an occupant-protecting device, namely an airbag arrangement 20, 40, 50, 70, 80, and 90 arranged in the backrest 16 or the head restraint 18, or both.

Figure 1:
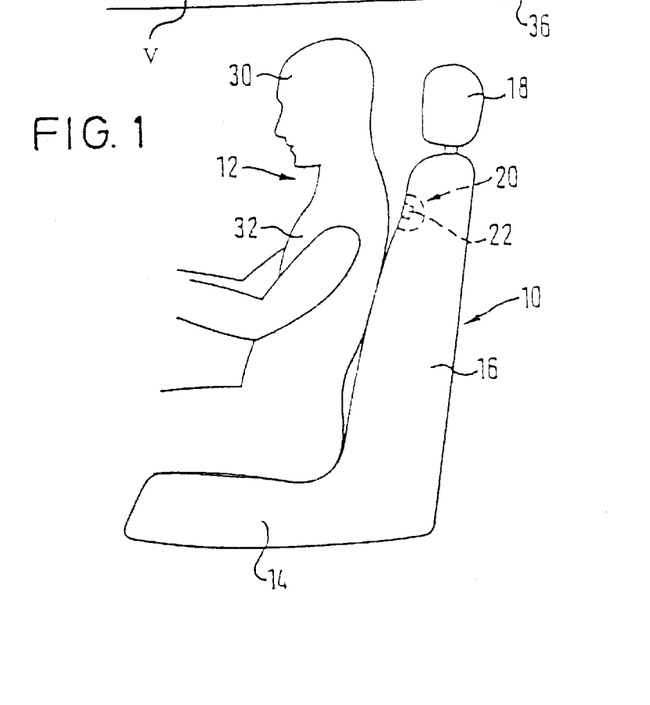
FIG. 1 schematically illustrates a side view of a first exemplary embodiment of an airbag arrangement before triggering its airbag.
Figure 2:
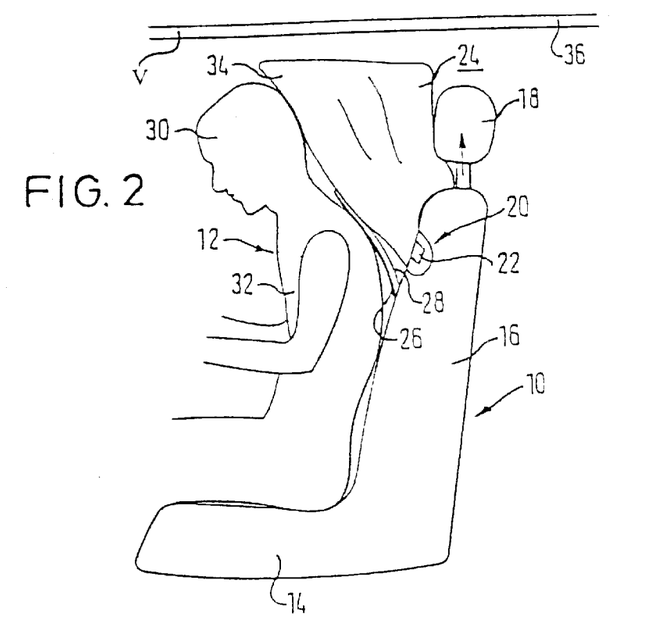
FIG. 2 schematically illustrates a side view of the airbag arrangement of FIG. 1, immediately after completely deploying the airbag.

Referring to FIGS. 1–2, the airbag arrangement 20 according to a first exemplary embodiment includes an airbag device 22, which is integrated (i.e., received and held in) with the backrest 16 near its upper portion. The airbag device 22 includes at least one air bag 24 and a multistage gas generator (not illustrated here; see FIG. 9) connected to the airbag 24. As shown in FIG. 2, the airbag 24, in the substantially fully deployed or inflated state, has a substantially wedge-shaped profile. Any conventional control unit (not illustrated) can be used to ignite the gas generator.

Figure 9:
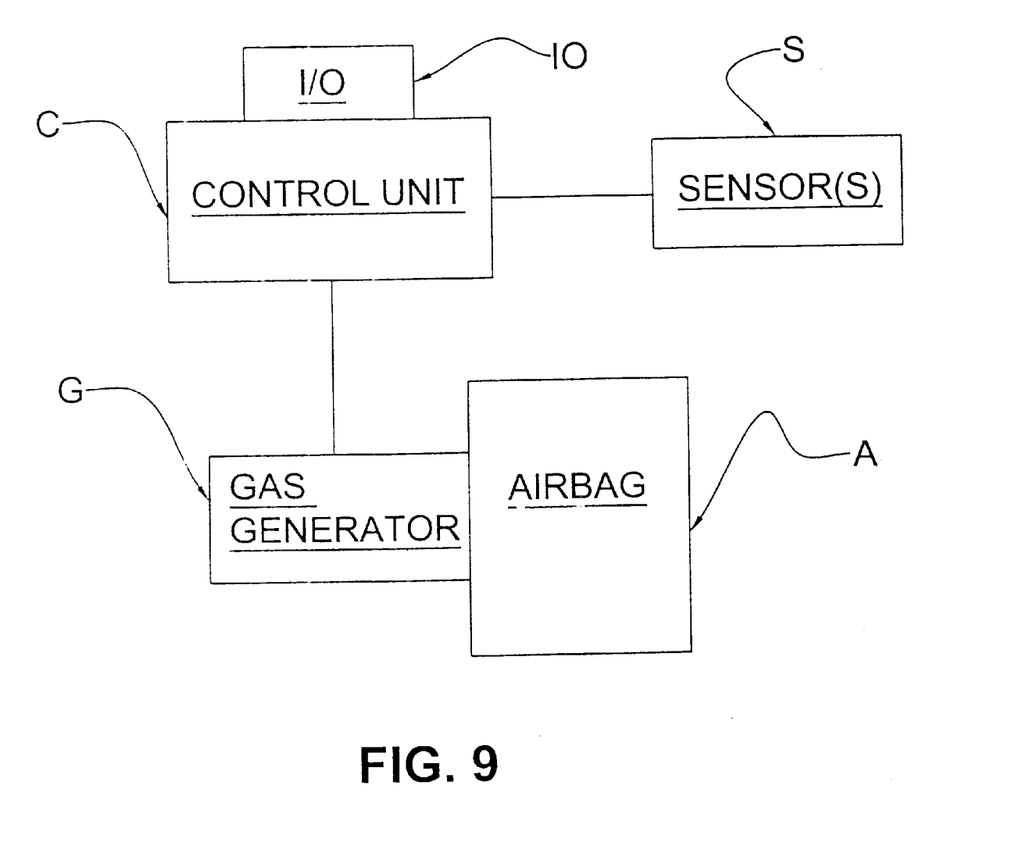
FIG. 9 schematically illustrates a block diagram of a control for the airbag device that can be used with the present airbag arrangements.

FIG. 9 illustrates a block diagram of an exemplary control unit that can be used with the present embodiments of the airbag arrangements. A control unit C, which can be a computer operated unit, in itself is conventional. The control unit C can be programmed to operate in a desired manner, which is well within the ambits of ordinary skill in the art. The control unit C is connected to one or more sensor S for trigging or igniting a gas generator G for igniting an associated airbag A, e.g., airbags 24, 54, 74, 84, 94, 96. In operation, one or more sensors S can be used to send a trigger signal to the control unit C, which can send ignite signal to trigger the gas generator G. For instance, the sensor can detect an impact and send a signal indicative of the impact to the control unit, which can determine the degree of impact and trigger the gas generator G accordingly. Other sensors S can be included to detect other control parameters, such as whether an occupant is wearing a seatbelt, whether the seat is unoccupied, or whether the seat is properly positioned for the airbag deployment, etc., for additional control of the airbag operation. The control unit C can have an I/O IO for receiving or sending a control signal, such as for delaying operation of another airbag arrangement, e.g. front airbag arrangement (not illustrated).

When the vehicle overturns or rolls over, the control unit C of the airbag device 22 can be programmed to ignite the gas generator G to inflate the airbag 24 so that the airbag 24 becomes fully inflated within a period of about 100 ms to 600 ms. The backrest 16, next to the airbag 24, can have a predetermined seam or seams (not illustrated), along which the seat covering 26 of the backrest 16 and the back cushion 28 tear apart in a predefined manner. After the seat covering 26 and the back cushion 28 have been torn apart along the seam(s), the airbag 24 emerges outwardly from the backrest 16 so that it becomes deployed in the direction of the occupant 12, as illustrated in FIG. 2.

To support the airbag on the vehicle seat over as large an area as possible, the airbag can be shaped while it is being deployed. In this respect, the airbag 24 can have one or more seams (not illustrated) for controlling the deployment. The airbag seams and the wedge-shaped airbag 24 can be configured so that the airbag 24, as it is being deployed, raises the head restraint 18 held displaceably on the backrest 16 to its raised position, as indicated by the arrow in FIG. 2. In its raised position, the head restraint 18 optimally supports the airbag 24. In its raised position, the head restraint 18 can support the airbag 24 over a larger area.

The airbag 24, in its fully inflated state, as shown in FIG. 2, by virtue of its wedge configuration, presses the occupant 12 strapped in the vehicle seat 10 away from the backrest 16, particularly in the head/neck region, in such a way that the occupant's head 30 bends or rolls toward the chest 32. At the same time, the previously torn-apart seat covering 26 and back cushion 28 are clamped between the occupant 12 and the deployed airbag 24. This prevents any malfunction of the airbag 24, for example due to clothing of the occupant 12 getting in the way of the airbag deployment.

The airbag 24 is inflated to the extent that it projects from the seatback 16 outwardly (forwardly) and upwardly, facing toward the seat portion 14 at an inclination to the longitudinal direction of the backrest 16 to form a wedge configuration 34 between the occupant's head 30 and the upper region of the backrest 16 and the head restraint 18 of the vehicle seat 10.

If the vehicle roof 36 were to be indented or if the occupant 12 were to move at least slightly out of the vehicle seat 10 toward the vehicle roof while the vehicle overturns or rolls over, the occupant's head 30, by virtue of the bent posture, can better yield in conformity to the rounded cervical spine, in the direction of the chest 32, to prevent or minimize injuries to the cervical spine.

To ensure that the airbag 24 opens properly, the control unit C of the airbag device 22 can have a plurality of sensors S that determine the position of the vehicle seat 10 and detect whether an occupant is properly seated on the vehicle seat 10, or whether the occupant 12 sitting on the vehicle seat 10 is strapped in.

When the vehicle seat 10 is in a position unfavorable for the triggering of the airbag 24, for example when the backrest 16 is inclined excessively, when the vehicle seat 10 is unoccupied, or when the occupant 12 sitting on the vehicle seat 10 is not firmly strapped in the vehicle seat 10, the control unit C of the airbag device 22 prevents the airbag 24 from being triggered.

If on the other hand, the control unit C of the airbag device 22 ignites the gas generator, the deployment of a front airbag (not illustrated) for a front collision can be delayed so that the front airbag does not simultaneous trigger or triggering in rapid succession with the airbag 24.

Figure 3:
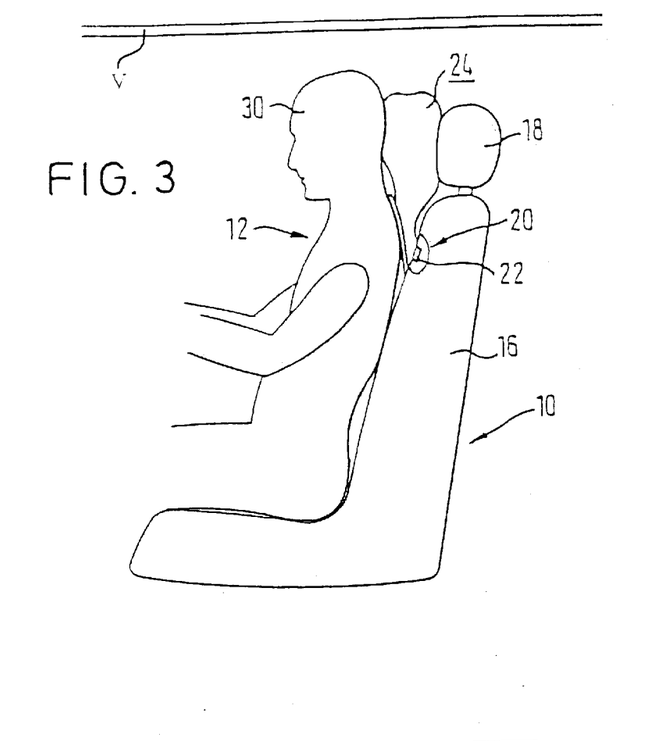
FIG. 3 schematically illustrates a side view of an airbag arrangement of FIG. 1, but with its airbag partially inflated.

Moreover, the control unit C of the airbag device 22 can be configured, so that during a front or rear collision, it only partially ignites a multistage gas generator associated with the airbag 24 to only partially inflate it, as illustrated in FIG. 3. In this configuration, the airbag 24, although emerges out from the backrest 16, is nevertheless deployed only partially to the extent that it slightly presses the head 30 of the occupant 12 away from the head restraint 18. In this partially inflated state, the shape of the airbag 24 can be controlled, for example using particular folding technique or seams, which would fully unfold or tear only if the airbag 24 were further inflated.

The airbag 24 remains in this partially inflated state during the collision so that the occupant 12, drawn back into the vehicle seat 10 by the safety belt or the belt tightener, when moving toward the backrest 16 as a result of mass inertia after the collision, cushions his or her head 30 into the only partially inflated airbag 24. This prevents the head from directly hitting against the head restraint 18, to prevent cervical spine whiplash traumas.

Figure 4:
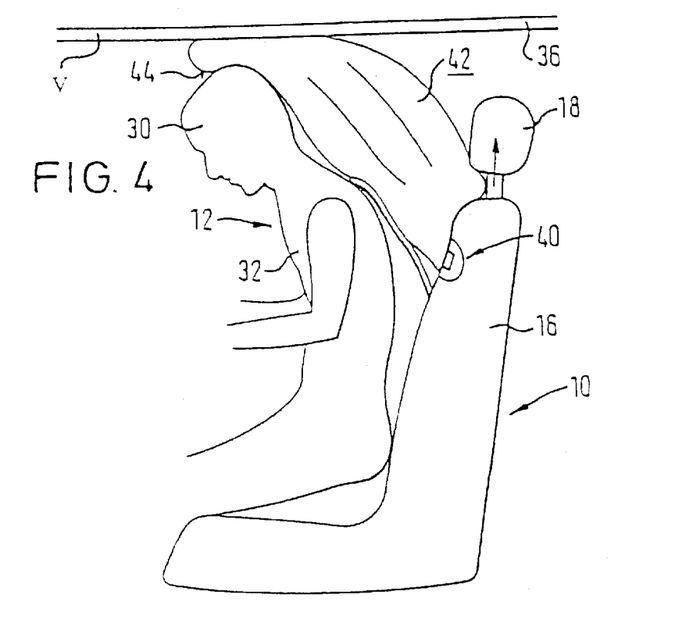
FIG. 4 schematically illustrates a side view of a second exemplary embodiment of an airbag arrangement, which has an airbag device serving as a chute for cushioning the vehicle occupant when the vehicle rolls over.

FIG. 4 illustrates a second exemplary embodiment of an airbag arrangement 40, the construction and functioning of which correspond substantially to the construction and functioning of the airbag arrangement 20 described above. The essential difference between these two airbag arrangements 20 and 40 is the airbag configuration. The airbag 42 of the second embodiment has, in the fully inflated state, an elongate shape that, starting from the backrest 16, extends at an incline relative to the longitudinal direction of the backrest, toward the occupant 12. As in the first exemplary embodiment, in this exemplary embodiment too, the airbag 42 presses the occupant's head 30 onto the occupant's chest 32 to assume a bent posture shown in FIG. 4.

Moreover, the airbag 42 is also designed as a chute 44 along which the occupant 12 can slide, guided in the direction of the vehicle roof 36, when the occupant 12 moves toward the vehicle roof 36, for example, because of a too loosely fastened safety belt. Due to the inclined posture of the occupant 12 forced by the airbag 42, the occupant 12 can at most impact the back of his head against the vehicle roof 36, at an uncritical angle, as indicated in FIG. 4. The airbag 42 located between the occupant's head 30 and the vehicle roof 36 cushions the head, additionally mitigating the impact against the vehicle roof 36.

With the aid of the airbag arrangement 40 described above, it is possible, particularly when the vehicle overturns or rolls, to guide the occupant's head 30 with the chute 44 to cushion the head 30 from the vehicle roof 36 and position the head 30 at a defined uncritical angle. Due to the bent posture of the occupant 12, the impact forces are exerted on the body of the occupant 12 in a direction favorable particularly for the cervical spine, namely in a way that the cervical spine can yield naturally, to avoid possible cervical spine injuries.

Figure 5:
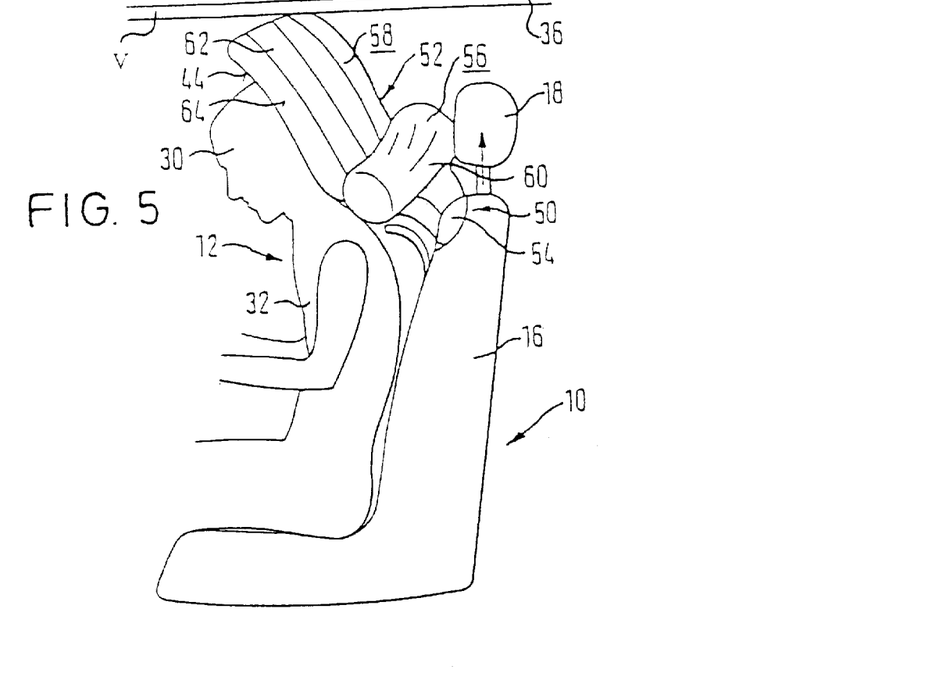
FIG. 5 schematically illustrates a side view of a third exemplary embodiment of an airbag arrangement, which has an airbag subdivided into a holding portion and a supporting portion.

FIG. 5 illustrates a third exemplary embodiment of an airbag arrangement 50, the functioning of which is substantially identical to the functioning of the airbag arrangement 40 according to the second exemplary embodiment. The main difference between the two exemplary embodiments is the airbag configuration. In this third exemplary embodiment, the airbag device 52 has an airbag 54 having a supporting portion 56 and a holding portion 58 adjoining the supporting portion 56. The supporting portion 56 is connected directly to the gas generator. The airbag 54, as in the second exemplary embodiment, in the inflated state, also acts as a chute 44. The supporting portion 56 and the holding portion 58 are flow-connected to one another so that the gas emerging from the gas generator first fills the supporting portion 56 and then the holding portion 58.

The supporting portion 56 can be formed from an elongated chamber 60 of round cross section, running transversely to the longitudinal direction of the backrest 16. During deployment, the supporting portion 56 presses the head restraint 18 and raises it into its raised position, as indicated by the arrow in FIG. 5. The holding portion 58 comprises a plurality of longitudinal chambers 62, which are arranged next to and connected to one another, and which, in the inflated state, extend with their longitudinal directions from the vehicle seat 10 in the direction of the vehicle roof 36, as shown in FIG. 5. In this case, the longitudinal chambers 62 of the holding portion 58 are separated from one another using seams, in such a way that the holding portion 58 has a cross-sectional shape arched in the direction of the seat portion 14. Because of this arched cross-sectional shape of the holding portion 58, the airbag 54 has, along the sides of the holding portion 58, raised margins 64. Due to the raised margins 64 along the sides of the airbag 54, the occupant's head 30 is brought into a defined position or alignment during the deployment of the airbag 54 so that the occupant assumes a protective position favorable for further sequence of movements.

What is achieved by subdividing the airbag into the supporting portion 56 and the holding portion 58 is that each of these components can be fine tailored optimally. That is, the supporting portion 56 can be optimized for absorbing the impact, while the holding portion 58 can be optimized (e.g., orienting the elongate chambers in the direction of the vehicle roof) for bending the occupant's head as previously described.

In this exemplary embodiment too, it is possible for the airbag 54 to be filled with gas only to the extent that, in the event of a front or rear collision of the vehicle, it acts as an airbag arrangement for protecting against a cervical spine whiplash. Moreover, in this exemplary embodiment too, the holding portion 58 can be designed such that it acts in the same way as the wedge 34 shown in the first exemplary embodiment in FIG. 2.

The holding portion and the supporting portion can form a common chamber. The advantage of using an airbag shaped this way is that the production of the airbag and, therefore, also the production of the airbag arrangement can be carried out in a comparatively simple way and without high outlay.

Figure 6:
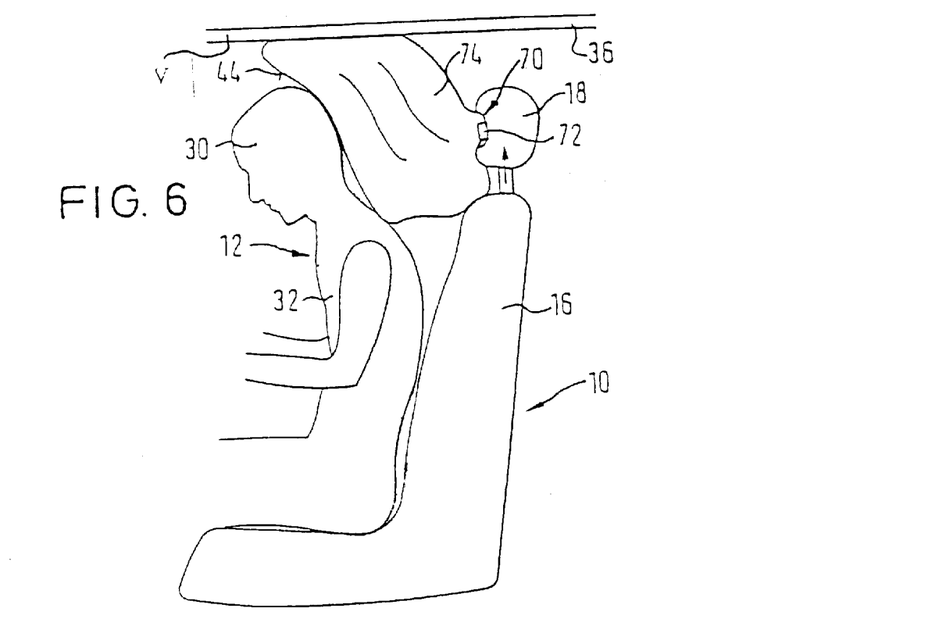
FIG. 6 schematically illustrates a side view of a fourth exemplary embodiment of an airbag arrangement, which has an airbag device integrated in the head restraint of a vehicle seat.

FIG. 6 shows a fourth exemplary embodiment of an airbag arrangement 70, which corresponds in functioning to the two airbag arrangements 40 and 50 described previously. The main difference between the airbag arrangement 70 and the airbag arrangements 40 and 50 described above is that the airbag arrangement 70 is integrated with the head restraint 18 instead of the backrest 16. The construction of the airbag 74 of the airbag device 72 corresponds essentially to the construction of the airbag 42 of the second exemplary embodiment. In this exemplary embodiment too, the airbag 74 during its deployment raises the head restraint 18 (see the arrow in FIG. 6) into its raised position so that the airbag 74 is better supported.

Figure 7:
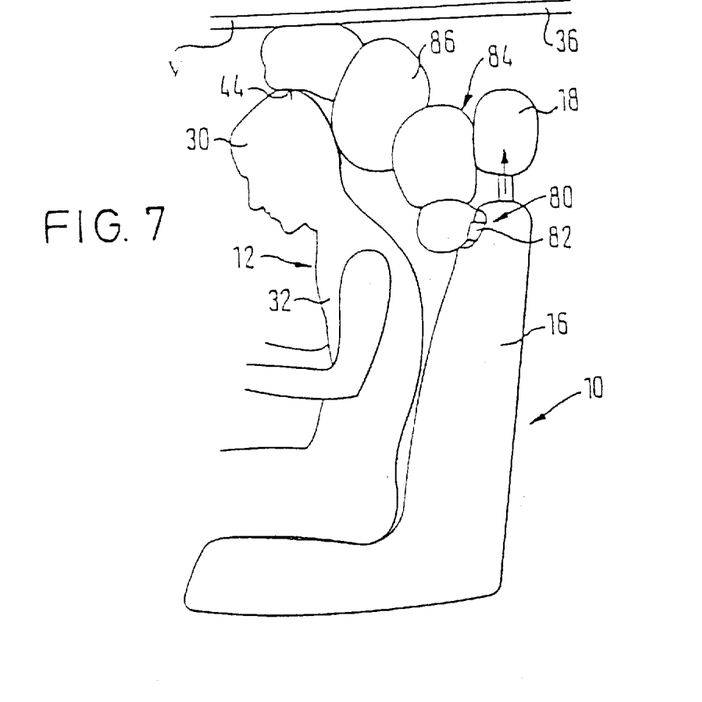
FIG. 7 schematically illustrates a side view of a fifth exemplary embodiment of an airbag arrangement, which has an airbag with a plurality of chambers.

FIG. 7 shows a fifth exemplary embodiment of an airbag arrangement 80, which, like the two airbag arrangements 40 and 50 described previously, has an airbag device 82 integrated into the backrest 16. In this exemplary embodiment, however, the airbag 84 is formed from a plurality of elongate chambers 86 arranged serially one after another. The elongate chambers 86 are flow-connected to one another and, in the inflated state, extend transversely to the longitudinal direction of the backrest 16 of the vehicle seat 10. The individual chambers 86 of the airbag 84 are connected serially so that, in the substantially fully inflated state, the airbag 84 has, starting from the vehicle backrest 16, a curved profile to form the chute 44. In this exemplary embodiment too, at least one of the chambers 86 of the airbag 84 resting directly against the head restraint 18 presses the head restraint 18 into its raised position (see the arrow in FIG. 7) to optimize the supporting surface for the airbag 84. Moreover, in this exemplary embodiment too, in the event of a front or rear collision, the airbag 84 can be only partially inflated, to protect the occupant from a neck whiplash. Furthermore, in this exemplary embodiment too, the airbag 84 can be configured so that it has a substantially wedge-shape configuration in the same way as the airbag 24 in the first exemplary embodiment.

The advantage of this embodiment is that the curvature of the airbag 84 can be implemented in a simple way with the individual chambers connected to one another serially. Furthermore, by virtue of being structured into various chambers, the airbag has a comparatively small volume, which, in turn, leads to a high dimensional stability of the airbag in the inflated state.

Figure 8:
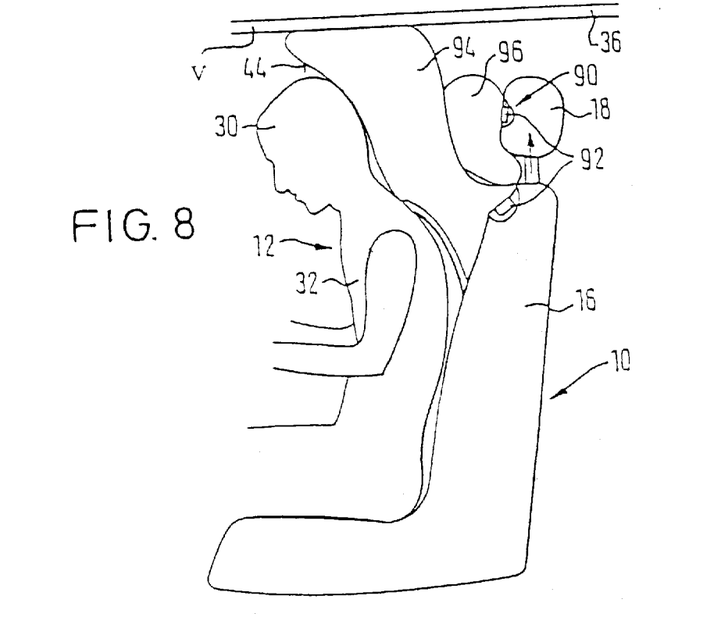
FIG. 8 schematically illustrates a side view of a sixth exemplary embodiment of an airbag arrangement, which has two airbag devices.

FIG. 8 illustrates a sixth exemplary embodiment of an airbag arrangement 90. In this sixth embodiment, the airbag arrangement 90 has an airbag device 92 with a first airbag 94 integrated with the backrest 16 and a second airbag 96 integrated with the head restraint 18. In this exemplary embodiment too, the airbag arrangement 90 serves to protect the head/neck region of the occupant 12. For this purpose, the first airbag 94 and the second airbag 96 can be inflated substantially simultaneously using two separate gas generators. The first airbag 94 serves as a chute 44. The second airbag 96, which is arranged between the first airbag 94 and the head restraint 18, serves to raise the head restraint 18 (see the arrow in FIG. 8), and serves to support the first airbag 94. If, in this exemplary embodiment, the airbag arrangement 90 is to perform only its function of protecting against cervical spine whiplash traumas, for example during a front or rear collision, only the second airbag 96 is deployed, while the gas generator of the first airbag 94 remains deactivated.

Finally, it should also be noted that in this exemplary embodiment too, the first airbag 94 can be designed such that it has a substantially wedge shape configuration, as described in the first exemplary embodiment.

When a vehicle overturns, the internal pressure in the inflated airbag has to be maintained for a relatively long period, so that the airbag can perform its protective function. Accordingly, the fabric of the airbag of the illustrated embodiments can be substantially airtight to maintain pressure for a predetermined period, preferably about 5 to 7 seconds after deployment. The gas contained in the airbag can be discharged with a delay after the vehicle has overturned, for example, using one or more valves, which can be time actuated.

The airbag arrangement of the present invention thus has at least one airbag that can fully inflate to protect the vehicle occupant's head/neck during a collision and a roller over. The airbag in its fully inflated state extends from the vehicle seat at an incline an angle relative to the backrest so that the airbag can actively bend the occupant's head toward the occupant's chest. Because the occupant assumes a bent posture, forced by the airbag, the top of occupant's head can no longer collide with the vehicle roof despite the safety belt being fastened, when the occupant moves in the direction of the vehicle roof, such as when the vehicle rolls over. Instead, the airbag controllably guides the occupant head/neck area in a defined bent posture so that, at most, the back of the head collides against the vehicle roof at an uncritical angle, cushioned by the airbag. The bent posture allows a natural yielding head movement to minimize any injuries to the cervical spine.

The present airbag arrangement is helpful for a convertible (softop or roofless) in preventing direct contact of the occupant's head with the ground while the convertible rolls over or drags on its frame parts and roll bars.

According to the present invention, the airbag can have a dual function, the first one being as just described above for protecting the occupant during a vehicle roller over. The airbag can be partially inflated protect the occupant's head/neck area during a front or rear collision. Thus, the second function of the present airbag arrangement is to protect the occupant from a cervical spine whiplash.

The disclosure of the priority application, German patent application No. DE 100 29 046.9, filed Jun. 13, 2000, in its entirety, including the drawings, claims, and the specification thereof, is incorporated herein by reference.

What is claimed is:

1. An airbag arrangement for a vehicle, comprising:
 a vehicle seat having a seat portion and a backrest extending from the seat portion, and a head restraint extending from the backrest; and an airbag device integrated with the vehicle seat, the airbag device having at least one airbag for protecting the head/neck region of an occupant, wherein the airbag, in the substantially fully inflated state, extends forwardly and upwardly from the vehicle seat at an incline relative to the backrest for actively inducing a bent posture, bending of the head of the occupant toward the chest of the occupant, wherein the airbag device further includes a gas generator and a control unit for actuating the gas generator, wherein the control unit is programmed to actuate the gas generator when the vehicle rolls over to fully inflate the airbag or when the vehicle is in a front or rear collision to partially inflate the airbag to an extent to position the airbag between the occupant's head and the head restraint, without displacing the occupant's head with the airbag.

2. An airbag arrangement according to claim 1, wherein the airbag in the substantially fully inflated state forms a wedge-shaped profile, adapted to be positioned between the occupant's head and the backrest for pressing the occupant's head into the bent posture.

3. An airbag arrangement according to claim 1, wherein the gas generator is a multistage gas generator.

4. An airbag arrangement according to claim 1, wherein the control unit is programmed to prevent the airbag from being deployed when the vehicle seat is in a predetermined position, identified as unsuitable for deploying the airbag, when the occupant is not strapped to a vehicle seatbelt, or when the vehicle seat is unoccupied.

5. An airbag arrangement according to claim 1, wherein the control unit is programmed to output a signal for delaying deployment of a front airbag arranged in the vehicle in front of the vehicle seat when the airbag for protecting the head/neck region is to be deployed.

6. An airbag arrangement according to claim 1, wherein at least the head restraint supports the airbag in the substantially fully inflated state.

7. An airbag arrangement according to claim 6, wherein the airbag in the substantially fully inflated state is adapted to be also supported on a roof of the vehicle.

8. An airbag arrangement according to claim 1, wherein the airbag has raised lateral margins extending along sides of the airbag in the substantially fully inflated state, along the direction of the seat portion.

9. An airbag arrangement according to claim 1, wherein the airbag includes a supporting portion and a holding portion, wherein when the airbag is in the substantially fully inflated state, the holding portion is adapted for actively bending the occupant's head and the supporting portion is arranged between the vehicle seat and the holding portion.

10. An airbag arrangement according to claim 9, wherein the holding portion comprises a plurality of longitudinal chambers arranged side by side and communicating with each other, and wherein the airbag, in the inflated state, is adapted to extend along a longitudinal direction of a vehicle roof.

11. An airbag arrangement according to claim 9, wherein the supporting portion includes at least one elongate chamber that extends transversely to the longitudinal direction of the backrest.

12. An airbag arrangement according to claim 9, wherein the airbag is sub-divided into the holding portion and the supporting portion, the holding portion and the supporting portion forming a common chamber.

13. An airbag arrangement according to claim 9, wherein the holding portion, in the substantially inflated state of the airbag, is configured to act as a chute, for pressing the occupant's head into the bent posture and for guiding the bent head in a predefined manner during movement of the occupant in a fore and aft direction of the vehicle.

14. An airbag arrangement according to claim 1, wherein the airbag comprises a plurality of elongate chambers arranged serially next to one another and communicating with each other, wherein in the substantially fully inflated state of the airbag, the elongated chambers extend transversely to the longitudinal direction of the backrest, and wherein the individual chambers are connected to one another serially so that the airbag, in the substantially fully inflated state, has a curved profile extending from the backrest for bending the occupant's head.

15. An airbag arrangement according claim 1, wherein the airbag in the substantially inflated state is configured to act as a chute, for pressing the occupant's head into the bent posture and for guiding the bent head in a predefined manner during movement of the occupant in a fore and aft direction of the vehicle.

16. An airbag arrangement according to claim 1, wherein the airbag device includes a first airbag integrated with the backrest for bending the occupant's head to assume the bent posture, and a second airbag integrated with the head restraint for supporting the first airbag, wherein the second airbag is arranged between the head restraint and the first airbag when the first and second airbags are in the substantially fully inflated state.

17. An airbag arrangement according to claim 1, wherein the airbag is substantially airtight, and in that the internal pressure in the airbag after inflation is maintained for a period of about 5 to 7 seconds.

18. An airbag arrangement according to claim 1, wherein the head restraint is adjustable between a lower position and an upper position, wherein the airbag is configured to raise the head restraint to the upper position during deployment to support the airbag over a larger area of the head restraint.

19. An airbag arrangement according to claim 1, wherein the airbag device is integrated with the backrest.

20. An airbag arrangement according to claim 1, wherein a seat covering of the backrest has a tear line for tearing apart in a predefined manner, and wherein the seat covering torn from the backrest is adapted to be arranged between the occupant and the airbag in the substantially inflated state.

21. An airbag arrangement according to claim 1, wherein the airbag device is integrated with the head restraint.

22. A vehicle comprising:
 a vehicle seat having a seat portion and a backrest extending from the seat portion, and a head restraint extending from the backrest; and
 an airbag device integrated with the vehicle seat, the airbag device having at least one airbag for protecting the head/neck region of an occupant,
 wherein the airbag, in the substantially fully inflated state, extends forwardly and upwardly from the vehicle seat at an incline relative to the backrest for actively inducing a bent posture, bending of the head of the occupant toward the chest of the occupant,
 wherein the airbag device further includes a gas generator and a control unit for actuating the gas generator, wherein the control unit is programmed to actuate the gas generator when the vehicle rolls over to fully inflate the airbag or when the vehicle is in a front or rear collision to partially inflate the airbag to an extent to position the airbag between the occupant's head and the head restraint, without displacing the occupant's head with the airbag.

23. A vehicle according to claim 22, wherein the gas generator is a multistage gas generator.

24. A vehicle according to claim 22, wherein the control unit is programmed to prevent the airbag from being deployed when the vehicle seat is in a predetermined position, identified as unsuitable for deploying the airbag, when the occupant is not strapped to a vehicle seatbelt, or when the vehicle seat is unoccupied.

25. A vehicle according to claim 22, wherein the control unit is programmed to output a signal for delaying deployment of a front airbag arranged in the vehicle in front of the vehicle seat when the airbag for protecting the head/neck region is to be ignited.

26. A method of protecting an occupant of a vehicle, comprising the steps of:

providing an airbag device integrated with a vehicle seat, the airbag device having at least one airbag for protecting the head/neck region of an occupant;

fully inflating the airbag when the vehicle rolls over to bend the head of the occupant toward the chest of the occupant into a bent posture with the airbag as the airbag is fully inflating; and partially inflating the airbag when the vehicle is in a front or rear collision to an extent to position the airbag between the occupant's head and a head restraint of the vehicle seat, without displacing the occupant's head with the airbag.

27. A method according to claim 26, further comprising the step of preventing the airbag from being deployed when the vehicle seat is in a predetermined position, identified as unsuitable for deploying the airbag, when the occupant is not strapped to a vehicle seatbelt, or when the vehicle seat is unoccupied.

28. A method according to claim 26, further comprising the step of delaying deployment of a front airbag arranged in the vehicle in front of the vehicle seat when the airbag for protecting the head/neck region is to be deployed.

* * * * *